United States Patent
Arai et al.

(10) Patent No.: US 6,869,672 B2
(45) Date of Patent: Mar. 22, 2005

(54) ANTIGLARE FILM, SHEET POLARIZER, AND IMAGE DISPLAY DEVICE

(75) Inventors: Tsutomu Arai, Kanagawa (JP); Ichiro Amimori, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 31 days.

(21) Appl. No.: 09/819,816

(22) Filed: Mar. 29, 2001

(65) Prior Publication Data

US 2002/0001681 A1 Jan. 3, 2002

(30) Foreign Application Priority Data

Mar. 29, 2000 (JP) ...................................... P.2000-092009

(51) Int. Cl.$^7$ .............................. B32B 5/16; B32B 9/04; B32B 27/00
(52) U.S. Cl. ........................ 428/323; 428/327; 428/328; 428/329; 428/330; 428/331; 428/411.1; 428/421
(58) Field of Search ................................ 428/323, 327, 428/328, 329, 330, 331, 411.1, 421, 325, 412, 422, 474.4, 480, 500, 515

(56) References Cited

U.S. PATENT DOCUMENTS

| | | | | |
|---|---|---|---|---|
| 5,853,801 A | * | 12/1998 | Suga et al. | 427/164 |
| 6,033,743 A | * | 3/2000 | Suzuki et al. | 428/1 |
| 6,074,741 A | * | 6/2000 | Murata et al. | 428/327 |
| 6,254,973 B1 | * | 7/2001 | Yoshida et al. | 428/212 |

FOREIGN PATENT DOCUMENTS

| | | | |
|---|---|---|---|
| JP | 61-209154 | | 9/1986 |
| JP | 03184072 | * | 6/1991 |
| WO | WO97/30021 | * | 8/1997 |

* cited by examiner

*Primary Examiner*—Sheeba Ahmed
(74) *Attorney, Agent, or Firm*—Burns, Doane, Swecker & Mathis, L.L.P.

(57) ABSTRACT

An antiglare film is described, which comprises a transparent support having thereon an antiglare layer, wherein the surface of the antiglare layer or the surface of a layer positioned above the antiglare layer is subjected to a rubbing treatment. A sheet polarizer and an image display device are also described.

13 Claims, 2 Drawing Sheets

ANTIGLARE FILM, SHEET POLARIZER, AND IMAGE DISPLAY DEVICE

FIELD OF THE INVENTION

The present invention relates to an antiglare film, a method for producing the same, an antireflection film having antiglare properties, a method for producing the same, a sheet polarizer, and an image display device and liquid crystal display device using the film or sheet polarizer.

BACKGROUND OF THE INVENTION

The antiglare film and the antireflection film used in an image display device such as a cathode-ray tube display device (CRT), a plasma display panel (PDP) and a liquid crystal display device (LCD), are generally disposed on the outermost surface of the display in which the reflectance is reduced by making use of the optical interference principle to prevent the reduction of contrast ascribable to the reflection of exterior light or to prevent the superposing of an image.

The display having disposed on the outermost surface thereof an antiglare film or an antiglare and antireflection film is prevented from the reduction of contrast ascribable to the reflection of external light or from the superposing of an image. However, on the other hand, when the display is viewed from the oblique direction, the black display shows white-tinted black or gray and this is disliked because the display quality decreases. This phenomenon is called bad sinking of black, loosened black or bad white tinting. This is a phenomenon such that light greatly scatters on the surface due to asperities formed on the film surface so as to impart antiglare property and the scattered light intermingles into the area which is originally viewed black, to show the area whitish. This causes worsening of the contrast and badly impairs the high-grade effect of the display. This may be overcome by reducing the numbers of asperities on the film surface, however, if the case is so, the white tinting may be improved but the antiglare property decreases. As a result of extensive investigations by the present inventors on the protrusion height and the number of protrusions, it has been found that as long as the antiglare property is the same, formation of a smaller number of large protrusions on the film surface is more advantageous in view of the white tinting than the formation of a large number of small protrusions.

On the other hand, when an image is viewed through an antiglare film or an antiglare and antireflection film, the transmitted image clarity deteriorates. This occurs because the transmitted light from picture elements is bent by the asperities on the film surface and thereafter, enters an eye. The transmitted image clarity can be measured by an image clarity measuring machine prescribed in JIS K7105-6.6. If the transmitted image clarity is bad, the image blurs on viewing.

As a result of studies, it has been found that the transmitted image clarity is determined by the protrusion height of asperities on the film surface and as the protrusion height is smaller, the clarity is higher. Asperities having a protrusion height in excess of a predetermined height cannot be used for a display directed to a higher grade. In other words, in the case of conventional antiglare film or antiglare and antireflection film, the attempt to attain both high transmitted image clarity and improved white tinting at the same time while maintaining the antiglare property cannot succeed only by the control of the protrusion height and the number of protrusions.

For compensating the antiglare property of the antiglare film, an antireflection function may be imparted to the film to reduce the light quantity of an image on a display. When the protrusion height on the film surface is set to a height capable of satisfying the transmitted image clarity and additionally an antireflection function is imparted, the number of protrusions can be more reduced than in the case of having no antireflection function. However, this technique still cannot compensate for the white tinting and the deterioration in contrast.

SUMMARY OF THE INVENTION

The object of the present invention is to provide an antiglare film and an antiglare and antireflection film, which can ensure improved white tinting and high clarity of the transmitted image.

The object of the present invention can be attained by the followings.

(1) An antiglare film comprising a transparent support having thereon an antiglare layer, wherein the surface of the antiglare layer or the surface of a layer positioned above the antiglare layer is subjected to a rubbing treatment.

(2) The antiglare film as described in (1), wherein the antiglare layer comprises particles and a binder.

(3) The antiglare film as described in (2), wherein the particles have an average particle size of 0.5 to 10 μm.

(4) The antiglare film as described in (2), wherein the particles having a size larger than ½ of the antiglare layer thickness occupy from 40 to 100% of all particles.

(5) The antiglare film as described in (2), wherein the particles are particles of polymethyl methacrylate resin, fluororesin, vinylidene fluoride resin, silicone resin, epoxy resin, nylon resin, polystyrene resin, phenol resin, polyurethane resin, cross-linked acrylic resin, cross-linked polystyrene resin, melamine resin and benzoguanamine resin, $TiO_2$, $Al_2O_3$, $In_2O_3$, $ZnO$, $SnO_2$, $Sb_2O_3$, $ZrO_2$, ITO, $MgF_2$, $SiO_2$ or aminosilicate.

(6) The antiglare film as described in (2), wherein the binder of the antiglare layer is a heat or ionizing radiation cured product of a mixture of a high refractive index monomer having a refractive index of 1.57 to 2.00 and a monomer having two or more ethylenically unsaturated groups.

(7) The antiglare film as described in (2), wherein the binder of the antiglare layer is a heat or ionizing radiation cured product of a mixture of an oxide ultrafine particle of a metal selected from Al, Zr, Zn, Ti, In and Sn, and a monomer having two or more ethylenically unsaturated groups.

(8) The antiglare film as described in (1), which comprises at least one low refractive index layer having a refractive index of 1.38 to 1.49.

(9) The antiglare film as described in (8), which comprises at least one layer having a refractive index higher than that of the support and at least one layer having a refractive index lower than that of the support.

(10) The antiglare film as described in (8), wherein the antiglare layer comprises a binder and particles, and the coating formed from a coating solution for the antiglare layer excluding particles having an average particle size of 1 μm or more has a refractive index of 1.57 to 2.00.

(11) The antiglare film as described in (8), wherein the low refractive index layer comprises a fluorine-containing compound having a dynamic friction coefficient of 0.03 to 0.15 and a contact angle to water of 90 to 120° and capable of crosslinking by heat or an ionization radiation.

(12) A sheet polarizer comprising a polarizing layer and two sheets of protective film, wherein at least one protective film is an antiglare film comprising a transparent support having thereon an antiglare layer, wherein the surface of the antiglare layer or the surface of a layer positioned above the antiglare layer is subjected to a rubbing treatment.

(13) The sheet polarizer as described in (12), wherein the antiglare film comprises at least one low refractive index layer having a refractive index of 1.38 to 1.49.

(14) The sheet polarizer as described in (13), wherein the antiglare layer comprises a binder and particles and the coating formed from a coating solution for antiglare layer excluding particles having an average particle size of 1 $\mu$m or more has a refractive index of 1.57 to 2.00.

(15) An image display device using an antiglare film for the outermost surface of the display, which antiglare film comprises a transparent support having thereon an antiglare layer, wherein the surface of the antiglare layer or the surface of a layer positioned above the antiglare layer is subjected to a rubbing treatment.

(16) The image display device as described in (15), wherein the antiglare film comprises at least one low refractive index layer having a refractive index of 1.38 to 1.49.

(17) The image display device as described in (16), wherein the antiglare layer comprises a binder and particles and the coating formed from a coating solution for the antiglare layer excluding particles having an average particle size of 1 $\mu$m or more has a refractive index of 1.57 to 2.00.

(18) The image display device as described in (15), wherein the display device is a liquid crystal display device.

Figure 1:
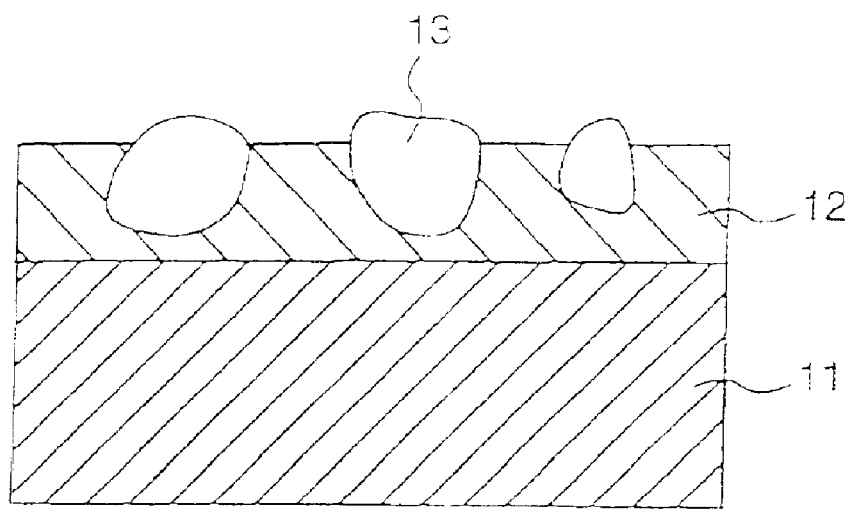
FIG. 1 shows a conceptual view of the antiglare film according to the present invention.

DESCRIPTION OF NUMERICAL REFERENCES 11 transparent support
12 antiglare layer
13 antiglare particle
21 transparent support
22 antiglare layer
23 antiglare particle
24 low refractive index layer
32a back-up roller
32b back-up roller
33 roller stage
34 transparent resin film
35 charge removing equipment
36 guide roller
37 surface dust removing machine
38 guide roller
38a rubbing sheet
39a surface dust removing machine
39b back-up roller

DETAILED DESCRIPTION OF THE INVENTION

The fundamental structures of the antiglare film and the antiglare and antireflection film of the present invention are described below by referring to the drawings.

FIG. 1 is one example of the antiglare film according to the embodiment of the present invention, where the antiglare film has a layer structure of a transparent support 11 and an antiglare layer 12 in this order. The antiglare layer may serve as a hard coat layer at the same time or a hard coat layer may be provided under the antiglare layer.

The numeral 13 is an antiglare particle and since particles having a size larger than ½ of the layer thickness of the antiglare layer occupy preferably from 40 to 100% by weight of all antiglare particles, asperities are formed on the surface and thereby the antiglare property is imparted.

Examples of the method for imparting the antiglare property to the antiglare layer include a method disclosed in JP-A-61-209154 (the term "JP-A" as used herein means an "unexamined published Japanese patent application") where an irregular layer prepared by adding particles to a binder is coated on a transparent support, a method disclosed in JP-A-6-16851 where a film having previously formed thereon an irregular surface is laminated on the coating layer of a transparent support to transfer the asperities, and a method where the asperities are formed by embossing a transparent support directly or through another layer such as hard coat layer.

Among these, a method of adding particles to a binder and thereby forming asperities is preferred because the production is simple and stable.

The particle of imparting the antiglare property is not particularly limited as long as asperities can be formed on the surface of the antiglare layer.

For effectively forming asperities on the surface of the antiglare layer, the average particle size is preferably from 0.5 to 10 $\mu$m, more preferably from 1 to 7 $\mu$m, still more preferably from 2 to 5 $\mu$m.

For the antiglare layer, antiglare particles where particles having a particle size larger than ½ of the layer thickness of the antiglare layer occupy from 40 to 100% by weight of all grains, can be used. As described above, these particles are used to form asperities on the surface and impart the antiglare property and therefore, as long as this condition is satisfied, there is no particular limitation thereon.

Examples of the antiglare particle include resin particles such as polymethyl methacrylate resin, fluororesin, vinylidene fluoride resin, silicone resin, epoxy resin, nylon resin, polystyrene resin, phenol resin, polyurethane resin, cross-linked acrylic resin, cross-linked polystyrene resin, melamine resin and benzoguanamine resin, and inorganic particles such as $TiO_2$, $Al_2O_3$, $In_2O_3$, $ZnO$, $SnO_2$, $Sb_2O_3$, $ZrO_2$, ITO (indium tin oxide), $MgF_2$, $SiO_2$ and aminosilicate. The particle is preferably insoluble in water or in an organic solvent. The shape thereof may be either amorphous or spherical.

In order to control the asperity, two or more kinds of particles may be used in combination as the antiglare particles added to the antiglare layers.

When the difference in the refractive index between the antiglare particle and the binder of forming the antiglare layer is less than 0.05, in the black display of LCD the reduction of contrast ascribable to the scattered light, namely, from the bad white tinting can be prevented. When the difference of refractive index is 0.05 or more, the white tinting may change for the worse but in a high-precision LCD, glaring ascribable to the enlargement of picture elements caused by the lens effect of the asperity can be prevented. Accordingly, it is preferred to design the refractive index of the antiglare particle according to the function required for the LCD used.

In the antiglare film and antiglare antireflection film according to the present invention, when a protrusion is cut off by a plane including normal vector at an apex of the protrusion portion of asperities on the film surface, and a straight line perpendicular to the normal is extended by 500 nm at right and left directions, an angle made from three points of a point at which the end of either one of straight lines extended at the right and left directions joins ridge line of the protrusion, another point at which the other straight line extended at the opposite direction joins ridge line of the protrusion and the apex is called "an apex angle". It is preferred that protrusions having the apex angle of at least 170° occupy at least 50%, more preferably at least 70%, particularly preferably at least 90%.

The apex angle is preferably at least 175°, most preferably 180°. That is, the apex angle of 180° means a plane.

Further, a circular truncated cone protrusion only the apex portion of which is a plane is preferred.

As a method for forming such a protrusion shape, there is such a method that after forming the asperities on the surface, an apex portion of protrusion is deformed. The effect of the present invention can be taken when protrusions whose the apex angle after the deformation is increased as compared with the apex angle before the deformation occupy at least 50%. The effect of the present invention can be remarkably taken when the apex angle is at least 170°.

The method for determining a protrusion shape is described below. The protrusion shape can preferably be determined by means of an atomic force microscope. It can be determined by means of an atomic force microscope system SPI 3800 manufactured by Seiko Instrument K.K. Specifically, a protrusion is cut off by a plane including normal vector at an apex of the protrusion portion, and a straight line perpendicular to the normal is extended by 500 nm at right and left directions. Because the protrusion is not completely symmetrical, a point at which the end of either one of straight lines extended at the right and left directions joins ridge line of the protrusion is called "point A", and another point at which the other straight line extended at the opposite direction of the straight line having the length of 500 nm joins ridge line of the protrusion is called "point B". An angle made from the three points, that is, the apex (hereinafter "point C"), the point A and the point B (the angle made by line BC and line AC) is called "an apex angle". Although when the shape of protrusion varies, the apex angle varies depending upon the method for setting the plane including normal vector for cutting off the protrusion, the presence of at least one plane meeting the apex angle of at least 170° is preferred. However, it is more preferred that even when protrusion is cut off by any plane, the apex angle is at least 170°

Further, the effect of the present invention can be taken even by forming the asperities on the surface of antiglare layer by particles and using a flat particle having a ratio of a long side/a short side of at least 2/1 in case where the particle is projected. When the particle is amorphous, the longest side of the projected particle is called "a long side" and the shortest side thereof is called "a short side". In this case, because the long sides of particles are arranged along the coating direction, the apex angle of the protrusion becomes at least 170°.

The present invention is characterized in that the surface of the antiglare layer or the surface of a layer positioned above the antiglare layer is subjected to a rubbing treatment where a rotating rubbing roller having a rubbing sheet is contacted with the surface while removing dusts. This is described in detail below.

The method for producing an antiglare film is described below. A lengthy transparent resin film delivered from a film roller by a delivering machine is transported by a driving roller and after removing dusts by a film dust removing machine, a coating solution containing raw materials for the antiglare layer is coated by a coating machine and dried in a heat-drying zone to form an antiglare layer on the film surface. Also, an antiglare layer and a hard coat layer may be separately formed by coating a hard coat layer on a film and then coating an antiglare layer. The thus-obtained film may be once taken up.

This transparent resin film having an antiglare layer is subjected to a rubbing treatment using a rubbing apparatus comprising a rubbing roller, a guide roller fixed to the roller stage, and a dust-removing machine equipped to the rubbing roller, and thereafter, the dusts are removed by a surface dust-removing machine provided adjacently to the rubbing apparatus. Other than the above-described rubbing apparatus, a known apparatus may also be used as long as it can rub the film surface. The timing for rubbing the film may be any after the formation of the antiglare layer. The surface of the antiglare layer may be rubbed or after coating a protective layer or a low refractive index layer on the antiglare layer, the surface thereof may be rubbed.

Figure 3A:
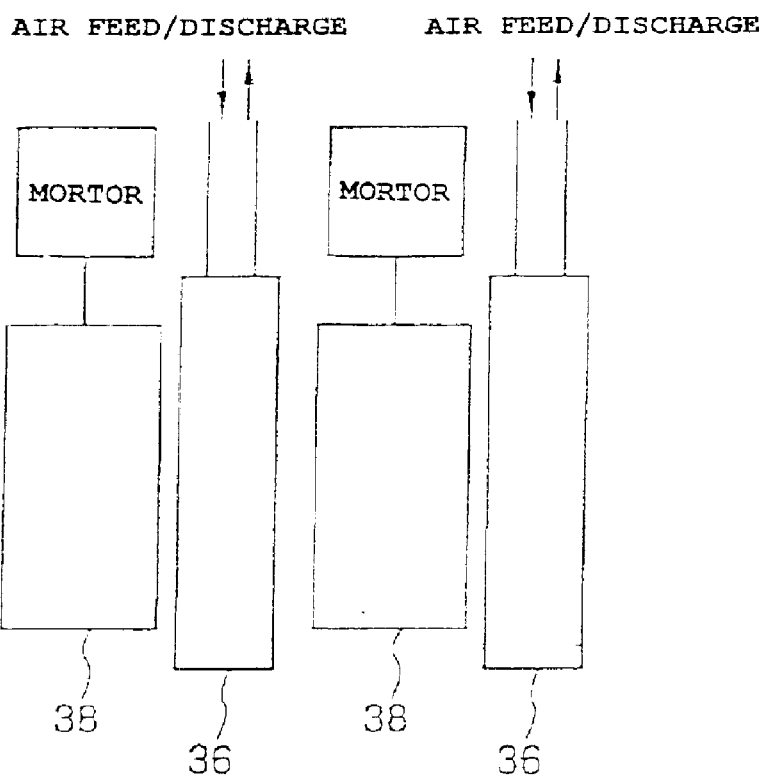
FIG. 3A shows a plan view of the rubbing apparatus and FIG. 3B shows a cross-sectional view of the rubbing apparatus.
Figure 3B:
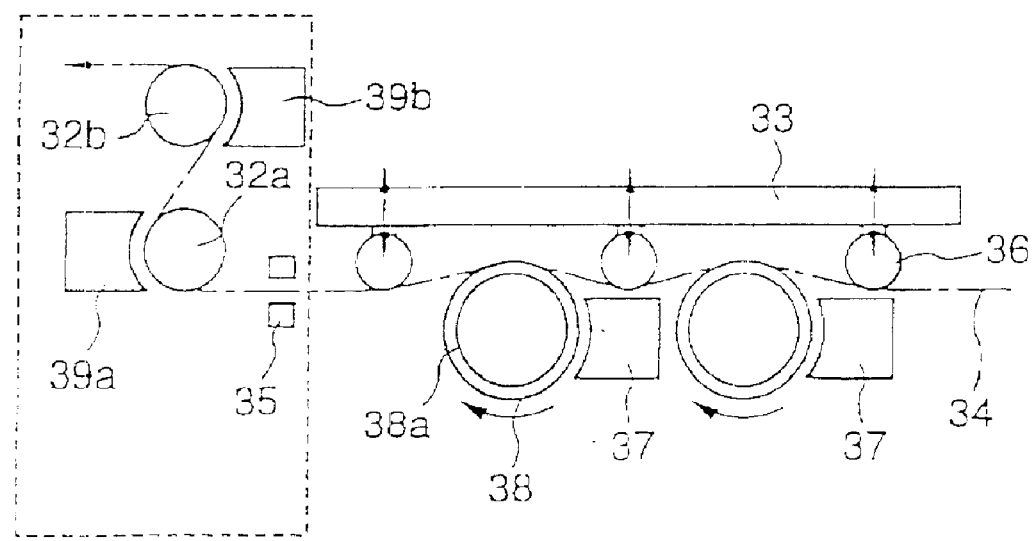

The rubbing method is described below by referring to FIGS. 3A and 3B. FIG. 3A shows a plan view of the rubbing apparatus and FIG. 3B shows a cross-sectional view of the rubbing apparatus. An antiglare film 34 having formed thereon an antiglare layer is transported in the arrow direction and along the guide roller (for example, having an outer diameter of 150 mm) 36 fixed to the roller stage 33 rotates in the direction opposite the transportation, the layer surface of the antiglare film is rubbed. The rubbing roller 38 can be controlled to a rotation speed of from 100 to 3,000 rpm and can freely rotate on the horizontal plane with respect to the film travelling direction, so that the rubbing angle can be freely controlled.

For example, the rubbing roller is rotated around an axis set to the center position in the length direction of the roller and the rubbing angle is controlled with respect to the film travelling direction, and in this state, while transporting the film at a constant tension and a constant speed (generally, 5 m/min or more) by a transporting apparatus, the rubbing roller is rotated at a constant rotation speed in the direction opposite the film transporting direction. By continuously performing the rubbing as such, the film is transported while floating due to the air foil effect and therefore, the film is prevented from moving in the cross direction and a stable rubbing treatment can be continuously performed. The guide roller 36 is equipped with a mechanism for detecting the tension with the film and can control the tension at the rubbing. Furthermore, the guide roller can be vertically adjusted and by moving this roller up or down, a lap angle can be controlled. The film transporting speed at the rubbing is generally from 10 to 50 m/min, the diameter of the rubbing roller is generally from 100 to 500 mm (preferably from 100 to 300 mm), and the rotation number of the rubbing roller is generally from 500 to 2,000 rpm. The base lap angle is preferably from 4 to 20° and the tension to the film is preferably from 1 to 2 N/1 cm (film width). In general, 2 to 4 rubbing rollers are used and the rotation axis of the rubbing roller is generally adjustable in the range from 0 to 45°. The rubbing roller is preferably designed to enable its connection or disconnection at the joint part by a roller lifting device.

In the present invention, immediately after the rubbing, dusts on the surface of the rubbing sheet 38a of the rubbing roller 38 are removed by a surface dust removing machine 37 provided in the proximity of the lateral surface of the rubbing roller 38 and therefore, dusts generated at the rubbing scarcely stay on the rubbing sheet surface of the rubbing roller or the dusts scarcely move from the rubbing sheet to the film surface.

After removing the electric charge from the front and back surfaces of the rubbed film by a charge removing equipment 35, the dusts on the film back surface are moved by a surface dust removing machine 39a provided in the proximity of a back-up roller 32 for transporting the film. Subsequently, the dusts on the surface of the antiglare layer are removed by a surface dust removing machine 39b provided in the proximity of the back-up roller 32b. The dust removal may be performed only on the antiglare layer surface. These surface dust removing machines (37, 39a, 39b) are preferably an ultrasonic dust removing machine having functions of blowing a compressed air under ultrasonic vibration and sucking dusts generated. Examples of the ultrasonic dust removing machine include New Ultra-Cleaner commercially available from Shinko K.K. The blowing wind velocity of the ultrasonic dust removing machine is generally from 10 to 50 m/sec, preferably from 10 to 30 m/m. The distance between the roller surface and the distal end of the dust removing machine is preferably from 2 to 5 mm. The diameter of the back-up roller is preferably from 50 to 150 mm.

With respect to the dust removal on the antiglare layer surface, a method of spraying a solvent and scraping off the dusts by a guide roller before the solvent evaporates or a method of removing the dusts by an adhesive roller may be used and these are disclosed in JP-A-9-166784.

The rubbing method which can be used in the present invention is not limited only to the method described above by referring to FIGS. 3A and 3B but any method may also be used as long as it can continuously rub a long sheet. Examples of the method which can be used include a back-up rubbing method of pressing a rubbing roller to a long film in the way of transportation at the position where the film is supported by a pass roller or a back-up roller, a lap rubbing method disclosed in JP-A-61-160720 where a rubbing roller is pressed to a long film between pass rollers or back-up rollers which are supporting the long film in the way of transportation, and a back-up rubbing method disclosed in JP-A-6-110059 where the film is supported by sprockets in both sides of the rubbing roller. Also, at the time when the rubbing treatment is interrupted, a cleaning film may be transported through the rubbing apparatus and through the dust-removing system apparatus to remove dusts adhering thereto.

Examples of the rubbing sheet for use in the rubbing treatment include a sheet obtained from rubber, nylon, polyester and the like, a sheet obtained from nylon fiber, rayon fiber, polyester fiber and the like (e.g., velvet), paper, gauze and felt. The relative speed between the film and the cloth is generally from 50 to 1,000 m/min, preferably from 100 to 500 m/min.

The antiglare and antireflection film is described below.

Figure 2:
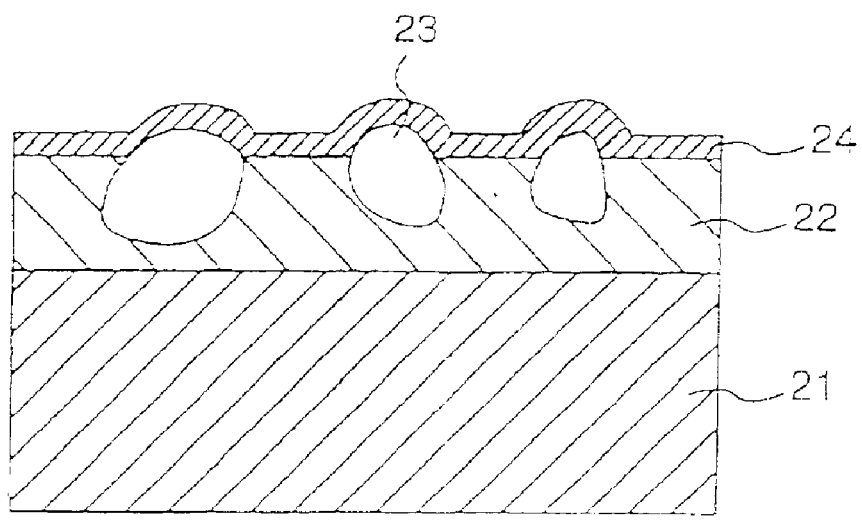
FIG. 2 shows a conceptual view of the antiglare and antireflection film according to the present invention.

FIG. 2 is a view showing one example of the antiglare and antireflection film according to the embodiment of the present invention. The numeral 21 is a transparent support, 22 is an antiglare layer, 23 is an antiglare particle, and 24 is a low refractive index layer. The antiglare layer may serve as a hard coat layer at the same time or a hard coat layer may be provided under the antiglare layer. The low refractive index layer of the antiglare and antireflection film preferably satisfies the following formula so as to obtain good antireflection performance.

$$(m\lambda/4) \times 0.7 < n_1 d_1 < (m\lambda/4) \times 1.3$$

wherein m is a positive odd number (generally 1), $n_1$ is a refractive index of the low refractive index layer, $d_1$ is a thickness (nm) of the low refractive index layer, and $\lambda$ is a wavelength.

Incidentally, to satisfy the formula above means that m (positive odd number, usually 1) satisfying the formula is present within the above-described range of wavelength.

The antiglare and antireflection film of the present invention has at least one low refractive index layer having a refractive index of 1.38 to 1.49. This low refractive index layer may be coated directly on the antiglare layer or may be coated on the antiglare layer through another layer.

The antiglare and antireflection film of the present invention may have at least one layer having a refractive index higher than that of the support and at least one layer having a refractive index lower than that of the support. In any case, as characteristic features, the film necessarily has an antiglare layer and a low refractive index layer, and the surface of the antiglare layer or the surface of a layer positioned above the antiglare layer is subjected to a rubbing treatment of bringing a rotating rubbing roller having a rubbing sheet into contact with the surface, for example. By virtue of these features, improvements can be attained on the large amplitude in the wavelength dependency of the reflectance, which is caused by the optical interference due to the difference in the refractive index between the antiglare layer and the support, and on the uneven color accompanying it.

The transparent film used here is preferably a plastic film. Examples of the material for the plastic film include cellulose esters (e.g., triacetyl cellulose, diacetyl cellulose, propionyl cellulose, butyryl cellulose, acetylpropionyl cellulose, nitrocellulose), polyamide, polycarbonate, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrenes (e.g., syndiotactic polystyrene), polyolefins (e.g., polypropylene, polyethylene, polymethylpentene), polysulfone, polyethersulfone, polyarylate, polyetherimide, polymethyl methacrylate and polyether ketone. Among these, triacetyl cellulose, polycarbonate, polyethylene terephthalate and polyethylene naphthalate are preferred.

The light transmittance of the transparent support as determined in accordance with JIS K7105-5.5 is preferably 80% or more, more preferably 86% or more. The haze of the transparent support as determined in accordance with JIS K7105-6.4 is preferably 2.0% or less, more preferably 1.0% or less. The refractive index of the transparent support is preferably from 1.4 to 1.7.

The refractive index of particles is determined by dispersing the particles in each of solvents which do not dissolve the particles and have refractive indexes different from each other and measuring the refractive index of the solvent making the transmittance of the dispersion greatest by Abbe refractometer.

From the standpoint of using the antiglare and antireflection film as a surface protective film of an image display device, triacetyl cellulose is preferred for LCD, polyethylene terephthalate and polyethylene naphthalate are preferred for PDP and CRT, and in the case of other rear projections, the support therefor and polycarbonate are preferred.

The antiglare layer is constituted by a binder, light-scattering mat particles and if desired, high refractive index fine particles. The mat particles preferably has an average particle size of 1 to 10 μm and for the mat particle, an organic particle such as polystyrene, polymethyl (meth) acrylate and polyethylene is used. The refractive index of the antiglare layer is from 1.57 to 2.00 and is determined by measuring the coated product having a construction exclusive of the mat particle.

The binder for use in forming the antiglare layer is not particularly limited but in view of the film formation, a polymer compound or a high molecular weight product obtained by cross-linking a low molecular compound is preferably used.

In the case of using the antiglare and antireflection film for the surface of an image display device, scratch resistance is necessary and for this purpose, a hard coat property is preferably imparted to the antiglare layer.

For imparting the hard coat property to the antiglare layer, a polymer having a saturated hydrocarbon or a polyether as the main chain is preferred and a polymer having a saturated hydrocarbon as the main chain is more preferred. The binder polymer is preferably crosslinked. The polymer having a saturated hydrocarbon as the main chain is preferably obtained by the polymerization reaction of an ethylenically unsaturated monomer. In order to obtain a crosslinked binder polymer, a monomer having two or more ethylenically unsaturated groups is preferably used.

Examples of the monomer two or more ethylenically unsaturated groups include esters of a polyhydric alcohol and (meth)acrylic acid (e.g., ethylene glycol di(meth) acrylate, 1,4-dichlorohexane diacrylate, pentaerythritol tetra (meth)acrylate, pentaerythritol tri(meth)acrylate, trimethylolpropane tri(meth)acrylate, trimethylolethane tri(meth) acrylate, dipentaerythritol tetra(meth)acrylate, dipentaerythritol penta(meth)acrylate, pentaerythritol hexa (meth)acrylate, 1,2,3-cyclohexane tetramethacrylate, polyurethane polyacrylate, polyester polyacrylate), vinyl benzene and derivatives thereof (e.g., 1,4-divinylbenzene, 2-acryloylethyl 4-vinylbenzoate, 1,4-divinylcyclohexanone), vinylsulfone (e.g., divinylsulfone), acrylamide (e.g., methylenebisacrylamide) and methacrylamide.

The polymer having a polyether as the main chain is preferably synthesized by the ring-opening polymerization of a polyfunctional epoxy compound.

After the coating, the monomer having an ethylenically unsaturated group must be cured by the polymerization reaction under ionizing radiation or heat.

In place of or in addition to the monomer having two or more ethylenically unsaturated groups, a crosslinked structure may be introduced into the binder polymer using a reaction of a crosslinkable group. Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester or a metal alcoxide such as urethane and tetramethoxysilane can be used as a monomer for introducing the crosslinked structure. A functional group which exhibits crosslinking property as a result of the decomposition reaction, such as block isocyanate group, may also be used. The crosslinkable group for use in the present invention is not limited to these compounds but may be a group which exhibits reactivity after the decomposition of the above-described functional group.

After the coating, this compound having a crosslinkable group must be crosslinked by heat or the like.

In order to render the binder of the antiglare layer to have a high refractive index, a high refractive index monomer having a refractive index of 1.57 to 2.00, preferably 1.65 or more, may be used. Examples of the high refractive index monomer include bis(4-methacryloylthiophenyl) sulfide, vinylnaphthalene, vinylphenylsulfide, 4-methacryloxyphenyl-4'-methoxyphenylthioether.

The antiglare and antireflection film of the present invention comprises a transparent support having thereon an antiglare layer comprising a binder and particle and having a refractive index of 1.57 to 2.00, and a low refractive index layer having a refractive index of 1.38 to 1.49, and this film is preferably manufactured by contacting a rotating rubbing roller having a rubbing sheet with the surface of the antiglare layer or the surface of a layer positioned above the antiglare layer.

Furthermore, in order to render the binder of the antiglare layer to have a high refractive index, the layer preferably contains fine particles comprising an oxide of at least one metal selected from the group consisting of titanium, zirconium, aluminum, indium, zinc, tin and antimony, and having a particle size of 100 nm or less, preferably 50 nm or less. Examples of the fine particle include fine particles of $TiO_2$, $Al_2O_3$, $In_2O_3$, $ZnO$, $SnO_2$, $Sb_2O_3$, $ZrO_2$ and ITO.

The amount of the inorganic fine particle added is preferably from 10 to 90% by weight, more preferably from 20 to 80% by weight, still more preferably from 30 to 60% by weight, based on the entire weight of the hard coat layer.

The compound for use in the low refractive index layer is not particularly limited as long as it is a fluorine-containing compound having a refractive index of 1.38 to 1.49. In view of the resistance against fouling and scratching, a fluorine-containing compound having a coefficient of kinetic friction of 0.03 to 0.15 as determined by means of TYPE-HEIDON-14 manufactured by HEIDON and a contact angle to water of 90 to 120° as determined by means of a contact angle meter (CA-DT•A Type) manufactured by Kyowa Kaimen Kagaku K.K. and capable of crosslinking by heat or ionizing radiation is preferred. In order to control coatability, film hardness or the like, another compound may also be used in combination. Examples of the crosslinkable fluorine-containing compound include fluorine-containing monomers and crosslinkable fluorine-containing polymers, and of these, crosslinkable fluorine-containing polymers are preferred in view of coatability.

Examples of the crosslinkable fluorine-containing polymer include perfluoroalkyl group-containing silane compounds (e.g., (heptadecafluoro-1,1,2,2-tetradecyl)-triethoxysilane) and fluorine-containing copolymers using a fluorine-containing monomer and a monomer for imparting a crosslinkable group as the constituent units.

Specific examples of the fluorine-containing monomer unit include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Yuki Kagaku), M-2020 (produced by Daikin)), and completely or partially fluorinated vinyl ethers.

Examples of the monomer for imparting a crosslinkable group include (meth)acrylate monomers previously having a crosslinkable functional group within the molecule, such as glycidyl methacrylate, and (meth)acrylate monomers having a carboxyl group, a hydroxyl group, an amino group or a sulfonic acid group, such as (meth)acrylic acid, methylol (meth)acrylate, hydroxyalkyl (meth)acrylate and allyl acrylate. In the latter case, a crosslinked structure can be introduced after the copolymerization and this is disclosed in JP-A-10-25388 and JP-A-10-147739.

Not only the polymer using the above-described fluorine-containing monomer as a constituent unit but also a copolymer with a monomer not containing a fluorine atom may be used. The monomer unit which can be used in combination is not particularly limited and examples thereof include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides, acrylonitrile derivatives and commercially available products JN-7219, JN-7221 and JN-7225 (all produced by JSR K.K.).

JN-7219, JN-7221 and JN-7225 have also slipping property and from the standpoint of attaining low refractive index, slippage and antifouling effect at the same time, JN-7219, JN-7221 and JN-7225 are preferred for the low refractive index layer.

Each layer of the antireflection film can be formed by the coating using a method of dip coating, air knife coating, curtain coating, roller coating, wire bar coating, gravure coating or extrusion coating (see, U.S. Pat. No. 2,681,294). Two or more layers may also be coated at the same time. The simultaneous coating method is described in U.S. Pat. Nos. 2,761,791, 2,941,898, 3,508,947 and 3,526,528, and Yuji Harasaki, *Coating Kogaku* (Coating Engineering), page 253, Asakura Shoten (1973).

The antireflection film is applied to image display devices such as liquid crystal display device (LCD), plasma display panel (PDP), electroluminescence display (ELD) and cathode-ray tube display device (CRT). When the antireflection film has a transparent support, the transparent support side is adhered to the image display surface of an image display device The transparent support for use in the present invention may be previously subjected to a saponification treatment.

It is also possible to perform the saponification treatment after the coating of a hard coat layer, and then coat thereon an antiglare layer and a low refractive index layer.

Also, the saponification treatment may be performed after all layers are coated. In any case, good effect of the present invention is brought out without any change.

The present invention is described in greater detail below by referring to the Examples, however, the present invention should not be construed as being limited thereto.

Preparation of Coating Solution A for Hard Coat Layer

In a mixed solvent containing 62 g of methyl ethyl ketone and 88 g of cyclohexanone, 250 g of DESOLITE KZ-7869 (ultraviolet curable hard coat composition, 72 wt %, produced by JSR K.K.) was dissolved. After coating and ultraviolet-curing this solution, the obtained coating had a refractive index of 1.53.

(Preparation of Coating Solution B-1 for Antiglare Layer)

In 52 g of a mixed solvent of methyl ethyl ketone/ cyclohexanone (=54/46 in % by weight), 91 g of a mixture of dipentaerythritol pentaacrylate and dipentaerythritol hexaacrylate (DPHA, produced by Nippon Kayaku K.K.), 100 g of DESOLITE KZ-7115 ($ZrO_2$ fine particle dispersion solution, produced by JSR K.K.), and 100 g of KZ-7161 ($ZrO_2$ fine particle dispersion solution, produced by JSR K.K.) were dissolved. To the resulting solution, 10 g of a photoinitiator (Irgacure 907, produced by Ciba-Geigy) was added. After coating and ultraviolet-curing this solution, the obtained coating had a refractive index of 1.61.

To the solution prepared above, 29 g of a dispersion solution obtained by dispersing 20 g of crosslinked polystyrene particles having an average particle size of 2.0 μm (SX-200H, produced by Soken Kagaku K.K.) in 80 g of a mixed solvent of methyl ethyl ketone/cyclohexanone (54/46 in % by weight) while stirring for 1 hour using a high-speed disperser at 5,000 rpm, was added and stirred. The resulting solution was filtered through a polypropylene-made filter having a pore size of 30 μm to prepare a coating solution for antiglare layer.

(Preparation of Coating Solution B-2 for Antiglare Layer)

Coating Solution B-2 for antiglare layer was prepared in the same manner as Coating Solution B-1 except that the amount of the crosslinked polystyrene particle of 2.0 μm added in Coating Solution B-1 was changed from 20 g to 15 g.

(Preparation of Coating Solution B-3 for Antiglare Layer)

Coating Solution B-3 for antiglare layer was prepared in the same manner as Coating Solution B-1 except that the amount of the crosslinked polystyrene particle of 2.0 μm added in Coating Solution B-1 was changed from 20 g to 10 g.

(Preparation of Coating Solution B-4 for Antiglare Layer)

Coating Solution B-4 for antiglare layer was prepared in the same manner as Coating Solution B-1 except that 20 g of crosslinked polystyrene particle of 2.0 μm added in Coating Solution B-1 was changed to 40 g of crosslinked polystyrene particles of 3.0 μm.

(Preparation of Coating Solution B-5 for Antiglare Layer)

Coating Solution B-5 for antiglare layer was prepared in the same manner as Coating Solution B-1 except that 20 g of crosslinked polystyrene particle of 2.0 μm added in Coating Solution B-1 was changed to 30 g of crosslinked polystyrene particles of 3.0 μm.

(Preparation of Coating Solution C for Low Refractive Index Layer)

To 93 g of a heat-crosslinkable fluorine-containing polymer having a refractive index of 1.42 (TN-049, produced by JSR K.K.), 8 g of MEK-ST (methyl ethyl ketone (MEK) dispersion of $SiO_2$ sol having an average particle size of 10 to 20 nm and a solid concentration of 30 wt %, produced by Nissan Chemical) and 100 g of methyl ethyl ketone were added and after the stirring, the solution was filtered through a polypropylene-made filter having a pore size of 1 μm to prepare a coating solution for low refractive index layer.

EXAMPLE 1

(Sample 1)

Coating Solution A for hard coat layer prepared above was coated on a 80 μm-thick triacetyl cellulose film (produced by Fuji Photo Film Co., Ltd.) using a bar coater and dried at 120° C. Thereafter, ultraviolet was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form a hard coat layer having a thickness of 4 μm.

On this hard coat layer, Coating Solution B-1 for antiglare layer prepared above was coated using a bar coater and dried at 120° C. in an atmosphere having an oxygen concentration of 0.01% or less as a result of nitrogen purging. Thereafter, ultraviolet was irradiated at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form an antiglare hard coat layer having a thickness of 1.4 μm. An apex angle was 162°. (as determined according to the method as described above by means of an atomic force microscope system SPI 3800 manufactured by Seiko Instrument K.K.)

As such, an antiglare film was manufactured.

(Sample 2)

After a hard coat layer and an antiglare layer were coated in the same manner as in Sample 1, a velvet-made rubbing roller having an outer diameter of 150 mm was rotated at 1,000 rpm in the direction opposite the film transportation to perform the rubbing at a tension of 1.8 N/cm and a transportation speed of 10 m/min, whereby an antiglare film was manufactured. An apex angle was 169°.

(Sample 3)

Coating Solution A for hard coat layer prepared above was coated on a 80 μm-thick triacetyl cellulose film (produced by Fuji Photo Film Co., Ltd.) using a bar coater and dried at 120° C. Thereafter, ultraviolet was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form a hard coat layer having a thickness of 4 μm.

On this hard coat layer, Coating Solution B-1 for antiglare layer prepared above was coated using a bar coater and dried at 120° C. in an atmosphere having an oxygen concentration of 0.01% or less as a result of nitrogen purging. Thereafter, ultraviolet was irradiated at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form an antiglare hard coat layer having a thickness of 1.4 μm.

Further thereon, Coating Solution C for low refractive index layer prepared above was coated using a bar coater, dried at 80° C. and then cross-linked under heat at 120° C. for 10 minutes to form a low refractive index layer having a thickness of 0.096 μm, whereby an antiglare and antireflection film was manufactured. An apex angle was 165°.

(Sample 4)

An antiglare and antireflection film was manufactured in the same manner as in Sample 3, except that after the coating of an antiglare layer, the rubbing was performed under the same conditions as in Sample 2 and then a low refractive index layer was coated. An apex angle was 172°.

(Sample 5)

An antiglare and antireflection film was manufactured in the same manner as in Sample 3, except that after the coating of a low refractive index layer, the rubbing was performed under the same conditions as in Sample 2. An apex angle was 177°.

(Sample 6)

An antiglare and antireflection film was manufactured in the same manner as Sample 3 except that Coating Solution B-2 was used for the antiglare layer in Sample 3. An apex angle was 161°.

(Sample 7)

An antiglare and antireflection film was manufactured in the same manner as Sample 3 except that Coating Solution B-3 was used for the antiglare layer in Sample 3. An apex angle was 161°.

(Sample 8)

An antiglare and antireflection film was manufactured in the same manner as Sample 3 except that Coating Solution B-4 was used for the antiglare layer in Sample 3. An apex angle was 167°.

(Sample 9)

An antiglare and antireflection film was manufactured in the same manner as Sample 3 except that Coating Solution B-5 was used for the antiglare layer in Sample 3. An apex angle was 167°.

(Evaluation of Antiglare Film and Antiglare and Antireflection Film)

The films obtained were evaluated on the following items.

(1) White Tinting

The white tinting of each film obtained was measured using a goniophotometer manufactured by Murakami Shikisai Gijutsu Kenkyusho. On a sample, light was irradiated from the 5° direction and the quantity of scattered light in the 45° direction deviated by 40° from the regular reflection of 5° direction was measured. The indication is a logarithm indication. The decrement in the value of 1 means intermingling of scattered light as much as 10 times and the decrement of 2 means as much as 100 times, revealing bad white tinting.

When the change in the value is 0.2 or more, the difference can be seen with an eye. With a value of 6.0 or more, the white tinting can be rated excellent.

(2) Transmitted Image Clarity

On the measurement by an image clarity measuring machine (the measurement principle is described in JIS K7105) manufactured by Suga Shikenki K.K., a value of 20% or more reveals aptitude for high-precision display. A value of 40% ore more is rated very excellent aptitude for high-precision display.

(3) Average Reflectance

Each antiglare and antireflection film was measured on the spectral reflectance at an incident angle of 5° in the wavelength region from 380 to 780 nm using a spectrophotometer (manufactured by Nippon Bunko). An average reflectance of 450 to 650 nm is used for the results.

(4) Evaluation of Antiglare Property

On each manufactured antiglare film, a naked fluorescent lamp (8,000 cd/m$^2$) without louver was reflected and the blur degree of the reflected image was evaluated based on the following criteria:

⊚: The contour of fluorescent lamp is not recognized at all.

○: The contour of fluorescent lamp was slightly recognized.

Δ: The fluorescent lamp was not clear but the contour could be recognized.

X: The fluorescent lamp was almost clearly recognized.

Samples rated X have no antiglare property and are rejected.

The results of Examples and Comparative Examples are shown in Table 1.

TABLE 1

|  | Haze (%) | Reflectance (%) | White tinting | Transmitted Image Clarity (%) | Antiglare Property | Coefficient of Kinetic Friction (—) | Contact Angle (°) | Remarks |
|---|---|---|---|---|---|---|---|---|
| Sample 1 | 17 | — | 5.7 | 41 | ⊙ | — | — | Comparison |
| Sample 2 | 17 | — | 6.2 | 45 | ⊙ | — | — | Invention |
| Sample 3 | 12 | 1.1 | 5.7 | 40 | ⊙ | 0.08 | 103 | Comparison |
| Sample 4 | 12 | 1.1 | 6.2 | 44 | ⊙ | 0.08 | 103 | Invention |
| Sample 5 | 12 | 1.1 | 6.2 | 45 | ⊙ | 0.08 | 103 | Invention |
| Sample 6 | 9 | 1.15 | 5.8 | 45 | ○ | 0.08 | 103 | Comparison |
| Sample 7 | 7 | 1.2 | 5.9 | 48 | X | 0.08 | 103 | Comparison |
| Sample 8 | 13 | 1.1 | 6.0 | 7 | ⊙ | 0.08 | 103 | Comparison |
| Sample 9 | 8 | 1.2 | 6.2 | 14 | ⊙ | 0.08 | 103 | Comparison |

It is seen from the results in Table 1 that the present invention can satisfy the antiglare property, white tinting and transmitted image clarity at the same time. If only the number of particles (change in the number of asperities on the surface) or the size of particles (change in the protrusion height on the surface) is changed, scramble occurs among the antiglare property, whiteness and transmitted image clarity and it is impossible to satisfy all performances at the same time.

Using the film of Example 1 according to the present invention, an antiglare and antireflection sheet polarizer was manufactured. Then, using this sheet polarizer, a liquid crystal display device was manufactured by disposing the antireflection layer for the outermost layer. As a result, exterior light was not reflected and the white tinting was good, so that superior visibility could be attained with excellent contrast and no showing of the reflected image due to the antiglare effect. Furthermore, the transmitted image clarity was good and therefore, the image was sharply viewed.

As described above, according to the present invention, an antiglare film and an antiglare and antireflection film are provided, which can ensure good white tinting and at the same time, good transmitted image clarity.

While the invention has been described in detail and with reference to specific embodiments thereof, it will be apparent to one skilled in the art that various changes and modifications can be made therein without departing from the spirit and scope thereof.

What is claimed is:

1. A method for producing an antiglare film comprising a transparent support having thereon an antiglare layer, the method comprising forming an antiglare layer and rubbing the surface of the antiglare layer or the surface of a layer positioned above the antiglare layer, wherein the surface of the antiglare layer or the surface of a layer positioned above the antiglare layer comprises protrusions, and wherein at least 50% of the protrusions of the rubbed surface have an apex angle of at least 170°.

2. The method for producing an antiglare film as claimed in claim 1, wherein at least 70% of the protrusions of the rubbed surface have an apex angle of at least 170°.

3. The method for producing an antiglare film as claimed in claim 2, wherein at least 90% of the protrusions of the rubbed surface have an apex angle of at least 170°.

4. The method for producing an antiglare film as claimed in claim 1, wherein the apex angle is at least 175°.

5. The method for producing an antiglare film as claimed in claim 4, wherein the apex angle is 180°.

6. The method for producing an antiglar film as claimed in claim 1, wherein the antiglare layer is formed on the transparent support by curing a composition comprising particles and a binder.

7. The method for producing an antiglare film as claimed in claim 6, wherein the particles having a size larger than ½ of the antiglare layer thickness occupy from 40 to 100% of all particles.

8. The method for producing an antiglare film as claimed in claim 6, wherein the particles are particles of polymethyl methacrylate resin, fluororesin, vinylidene fluoride resin, silicone resin, epoxy resin, nylon resin, polystyrene resin, phenol resin, polyurethane resin, cross-linked acrylic resin, cross-linked polystyrene resin, melamine resin, benzoguanamine resin, $TiO_2$, $Al_2O_3$, $In_2O_3$, $ZnO$, $SnO_2$, $Sb_2O_3$, $ZrO_2$, ITO, $MgF_2$, $SiO_2$ or aminosilicate.

9. The method for producing an antiglare film as claimed in claim 6, wherein the binder of the antiglare layer is a heat or ionizing radiation cured product of a mixture of an oxide ultrafine particle of a metal selected from Al, Zr, Zn, Ti, In and Sn, and a monomer having two or more ethylenically unsaturated groups.

10. The method for producing an antiglare film as claimed in claim 1, wherein at least one low refractive index layer having refractive index of 1.38 to 1.49 is formed as the layer positioned above the antiglare layer.

11. The method for producing an antiglare film as claimed in claim 10, wherein the low refractive index layer comprises a fluorine-containing compound having a dynamic friction coefficient of 0.03 to 0.15 and a contact angle to water of 90 to 120° and capable of crosslinking by heat or an ionization radiation.

12. The method for producing an antiglare film as claimed in claim 1, wherein the rubbing is performed at a film transporting speed of from 10 to 50 m/min and a tension of the film of from 1 to 2 N/1 cm (film width).

13. The method for producing an antiglar film as claimed in claim 1, wherein the rubbing is performed by rotating a rubbing roller having a diameter of from 100 to 500 mm at a rotation number of from 500 to 2,000 rpm.

* * * * *